US009956831B2

(12) United States Patent
Summers et al.

(10) Patent No.: US 9,956,831 B2
(45) Date of Patent: May 1, 2018

(54) COMBINATION TIRE PRESSURE SENSOR AND OVER-INFLATION PRESSURE RELIEF VALVE

(71) Applicant: GOODRICH CORPORATION, Charlotte, NC (US)

(72) Inventors: Paul Summers, Troy, OH (US); Steven Keller, Union, OH (US); Scott Whittle, Springboro, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 72 days.

(21) Appl. No.: 14/570,890

(22) Filed: Dec. 15, 2014

(65) Prior Publication Data
US 2016/0169762 A1    Jun. 16, 2016

(51) Int. Cl.
| | | |
|---|---|---|
| B60C 23/04 | (2006.01) | |
| F16K 17/40 | (2006.01) | |
| G01L 17/00 | (2006.01) | |
| B33Y 80/00 | (2015.01) | |
| B64C 25/34 | (2006.01) | |
| F16K 17/16 | (2006.01) | |
| B60C 29/06 | (2006.01) | |
| G01L 19/08 | (2006.01) | |

(52) U.S. Cl.
CPC .............. *B60C 23/04* (2013.01); *B33Y 80/00* (2014.12); *B60C 23/0484* (2013.01); *B60C 23/0496* (2013.01); *B60C 29/068* (2013.01); *B64C 25/34* (2013.01); *F16K 17/16* (2013.01); *F16K 17/403* (2013.01); *G01L 17/00* (2013.01); *B60C 23/0498* (2013.01); *G01L 19/086* (2013.01)

(58) Field of Classification Search
CPC ... B60C 23/0494; B60C 29/068; F16K 17/16; F16K 17/403
USPC ......... 137/68.23, 68.25, 224, 227, 228, 230, 137/231; 152/427
See application file for complete search history.

(56) References Cited

U.S. PATENT DOCUMENTS

| | | | | |
|---|---|---|---|---|
| 1,261,018 A | * | 4/1918 | Gebhardt ................ | B60S 5/043 137/224 |
| 3,693,691 A | * | 9/1972 | Summers ................ | B60C 29/06 137/68.26 |
| 4,064,923 A | * | 12/1977 | German .................. | B60C 29/02 152/415 |
| 4,219,040 A | * | 8/1980 | Fallon .................... | B67D 1/125 137/209 |
| 4,248,080 A | | 2/1981 | Chuck | |
| 4,365,643 A | | 12/1982 | Masclet | |
| 4,517,834 A | | 5/1985 | Luke | |

(Continued)

FOREIGN PATENT DOCUMENTS

| | | |
|---|---|---|
| FR | 2551556 | 3/1985 |
| JP | H02229972 | 9/1990 |

OTHER PUBLICATIONS

U.S. Appl. No. 14/789,721, filed Jul. 1, 2015.

(Continued)

*Primary Examiner* — Mary McManmon
*Assistant Examiner* — Richard K Durden
(74) *Attorney, Agent, or Firm* — Snell & Wilmer LLP

(57) ABSTRACT

The present disclosure includes a combination sensor and pressure relief valve. The combination sensor and valve may be used with existing aircraft wheel systems. Wheel systems utilizing the combination sensor and valve are also disclosed.

17 Claims, 5 Drawing Sheets

(56) References Cited

U.S. PATENT DOCUMENTS

| | | | | |
|---|---|---|---|---|
| 4,913,184 | A | * | 4/1990 | Fallon .................... F16K 17/40 137/68.19 |
| 5,181,977 | A | | 1/1993 | Gneiding et al. |
| 5,335,541 | A | * | 8/1994 | Sharpe .................... B60C 23/02 340/445 |
| 5,365,967 | A | | 11/1994 | Moore |
| 7,509,849 | B2 | * | 3/2009 | Rutherford ......... B60C 23/0408 340/447 |
| 2008/0314488 | A1 | | 12/2008 | Achterholt |
| 2013/0269849 | A1 | * | 10/2013 | Hennig ................. B60C 23/003 152/427 |
| 2017/0001484 | A1 | | 1/2017 | Keller et al. |

OTHER PUBLICATIONS

Extended European Search Report dated Apr. 15, 2016 in European Application No. 15199479.5.
Preinterview First Office Action dated Jul. 29, 2016 in U.S. Appl. No. 14/789,721.
Extended European Search Report dated Nov. 2, 2016 in European Application No. 16177563.0.
First Action Interview Office Action dated Sep. 20, 2016 in U.S. Appl. No. 14/789,721.
Communication under Rule 71(3) EPC dated Mar. 20, 2017 in European Application No. 15199479.5.
Supplemental Notice of Allowance dated Apr. 19, 2017 in U.S. Appl. No. 14/789,721.
Notice of Allowance dated Mar. 28, 2017 in U.S. Appl. No. 14/789,721.

* cited by examiner

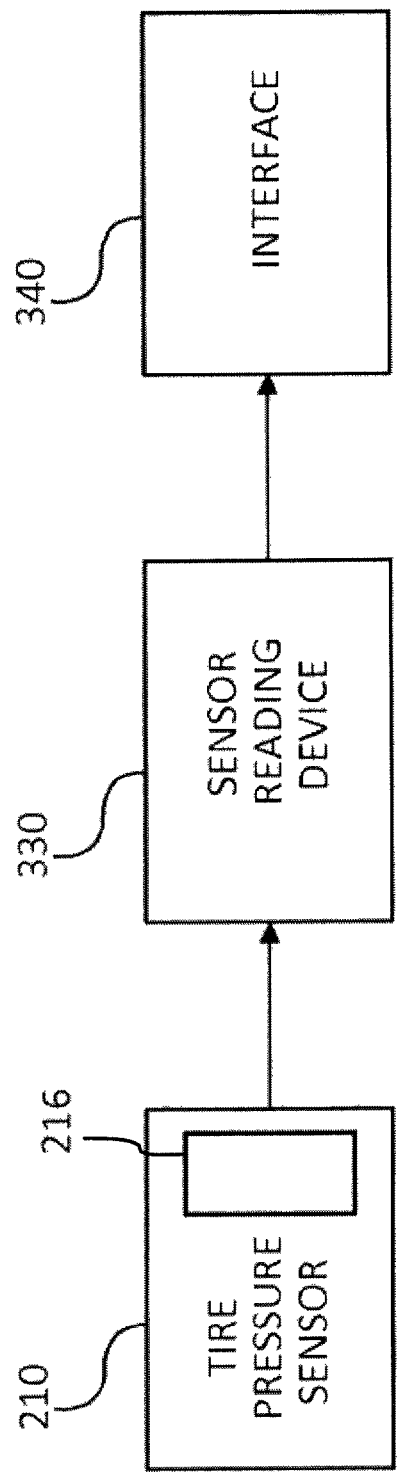

COMBINATION TIRE PRESSURE SENSOR AND OVER-INFLATION PRESSURE RELIEF VALVE

FIELD

The present disclosure relates generally to tire pressure sensors and, more specifically, to combination tire pressure sensors and over-inflation pressure relief valves for aircraft.

BACKGROUND

Conventional aircraft wheel assemblies often include over-inflation pressure relief valves to prevent over-inflation of aircraft tires. Fewer aircraft wheel assemblies include tire pressure monitoring systems. Adding tire pressure monitoring systems to existing aircraft can be expensive and require significant additional equipment and wiring. Further, in some aircraft, the additional equipment cannot be installed after initial assembly. As such, it may be beneficial to provide a less expensive, more widely usable tire pressure monitoring system to accommodate existing aircraft.

SUMMARY

In various embodiments, a combination sensor and pressure relief valve may include a housing comprising a stem defining an opening, an over-inflation pressure relief valve within the housing in fluid communication with the opening and comprising a frangible disk configured to rupture at a predetermined pressure, and a tire pressure sensor within the housing in fluid communication with the opening. The stem may comprise a threaded pattern configured to mate with a complementary threaded receptacle in a wheel. The tire pressure sensor may comprise a pinless connector configured to provide pressure data, and the pinless connector may be powered and interrogated by an external magnetic field and/or configured to communicate with a sensor reading device. The housing may comprise a metal. The predetermined pressure at which the frangible disk ruptures may be between about 1400 kPa and 2000 kPa, and further, about 1700 kPa.

In various embodiments, an aircraft wheel system may include a wheel having a sensor receptacle, and a combination pressure sensor and pressure relief valve comprising a housing having a stem and an opening, an over-inflation pressure relief valve within the housing in fluid communication with the opening comprising a frangible disk configured to rupture at a predetermined pressure, and a tire pressure sensor within the housing in fluid communication with the opening. The stem may comprise a threaded pattern configured to mate with a complementary threaded pattern of the sensor receptacle in the wheel. The tire pressure sensor may comprise a pinless connector configured to provide pressure data, and the pinless connector may be powered and interrogated by an external magnetic field. The system may include a smart electronic wand capable of powering and interrogating the pinless connector and receiving tire pressure data from the pinless connector. Further, the system may utilize an interface wherein the smart electronic wand transmits tire pressure data to the interface. The predetermined pressure at which the frangible disk ruptures may be between about 1400 kPa and 2000 kPa, and further, about 1700 kPa. The housing may comprise a metal.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 3 illustrates a schematic diagram of a wheel system in accordance with various embodiments.

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

The present disclosure describes various embodiments of combination sensor and valves for use with aircraft wheels, as well as aircraft wheel systems. Various embodiments of such systems may be utilized in new aircraft designs, or retrofit to existing aircraft. As will be described in more detail, systems comprising a combined over-inflation pressure relief valve and a tire pressure sensor are provided herein.

Figure 1:
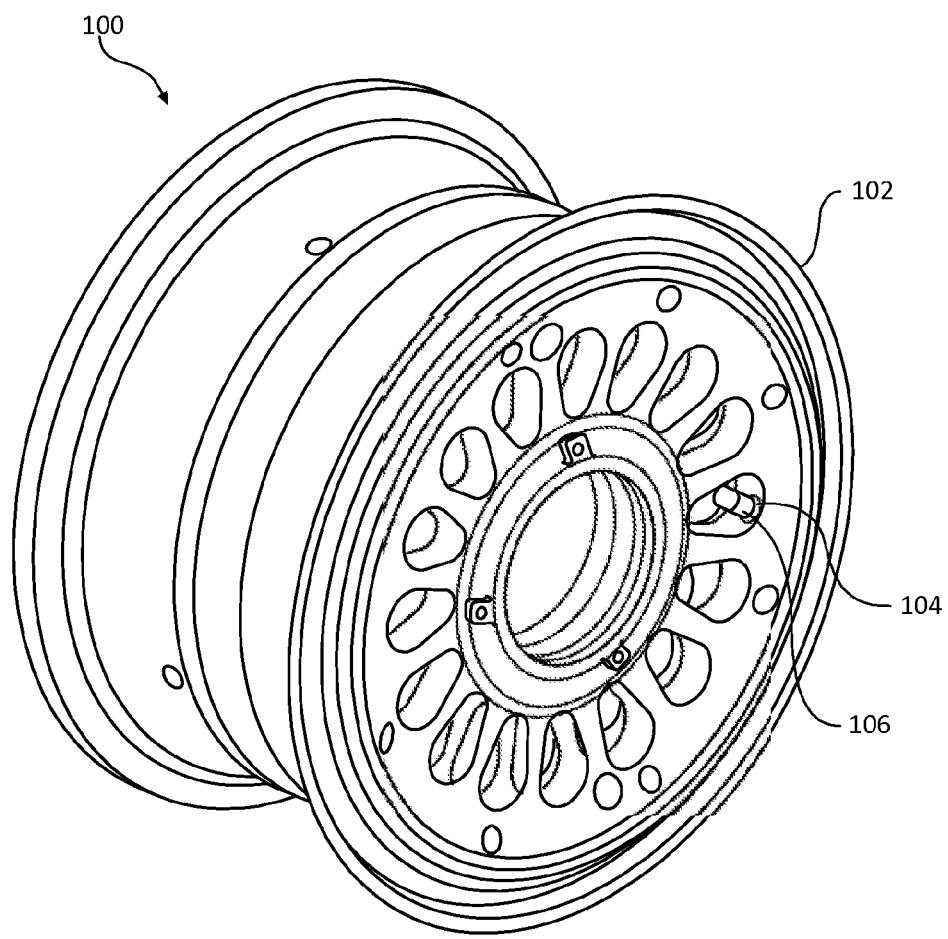
FIG. 1 illustrates a perspective view of an aircraft wheel in accordance with various embodiments.

With initial reference to FIG. 1, a wheel system 100 in accordance with various embodiments is illustrated. In various embodiments, wheel system 100 comprises a wheel 102 having a valve receptacle 104. Valve receptacle 104 may, for example, receive a combination sensor 106. In various embodiments, valve receptacle 104 may have the same size, shape, and configuration as conventional tire pressure sensor receptacles of conventional aircraft wheel systems. For example, combination sensor 106 may comprise a threaded portion configured to mate with a complementary threaded portion of a sensor and/or valve. However, any configuration of valve receptacle 104 is within the scope of the present disclosure.

Figure 2A:
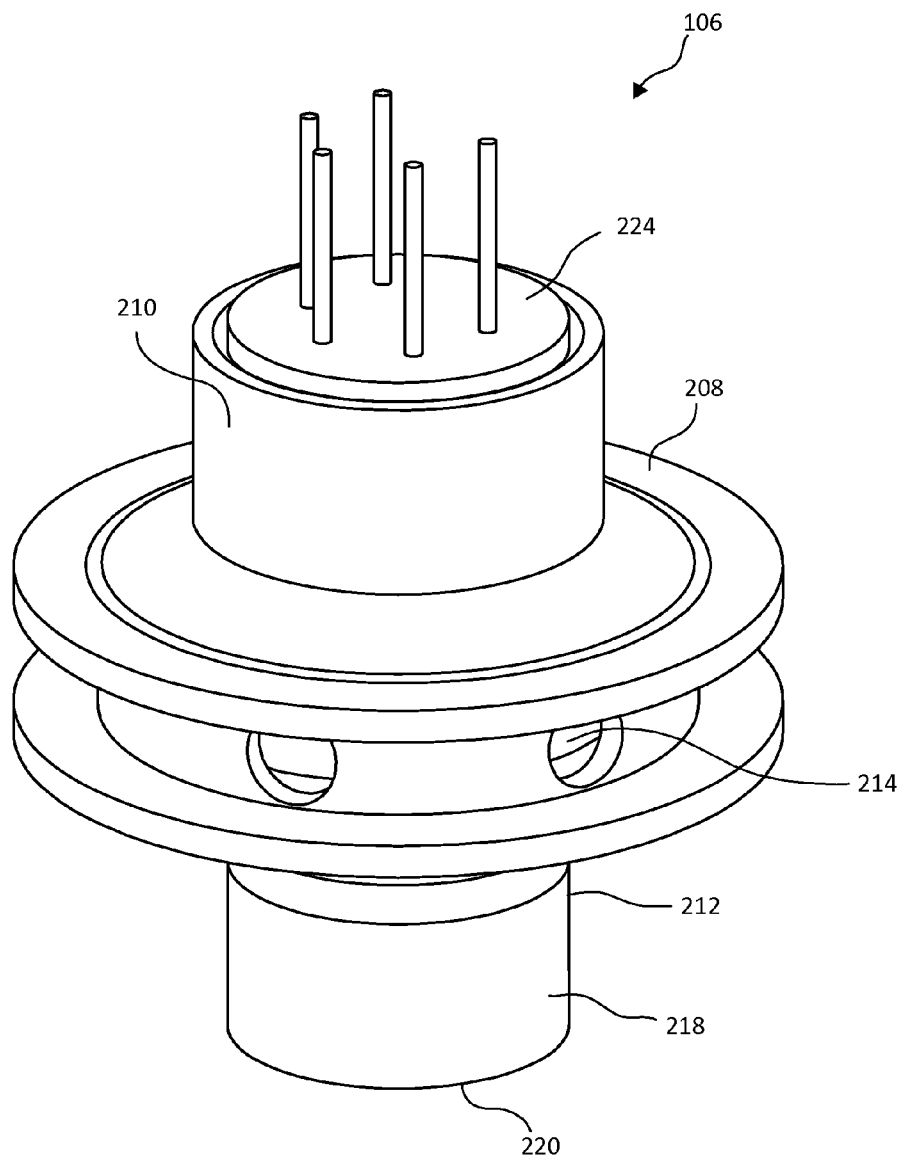
FIGS. 2A-2C illustrate, respectively, a side view, a cross sectional view, and a top view of a sensor in accordance with various embodiments.
Figure 2B:
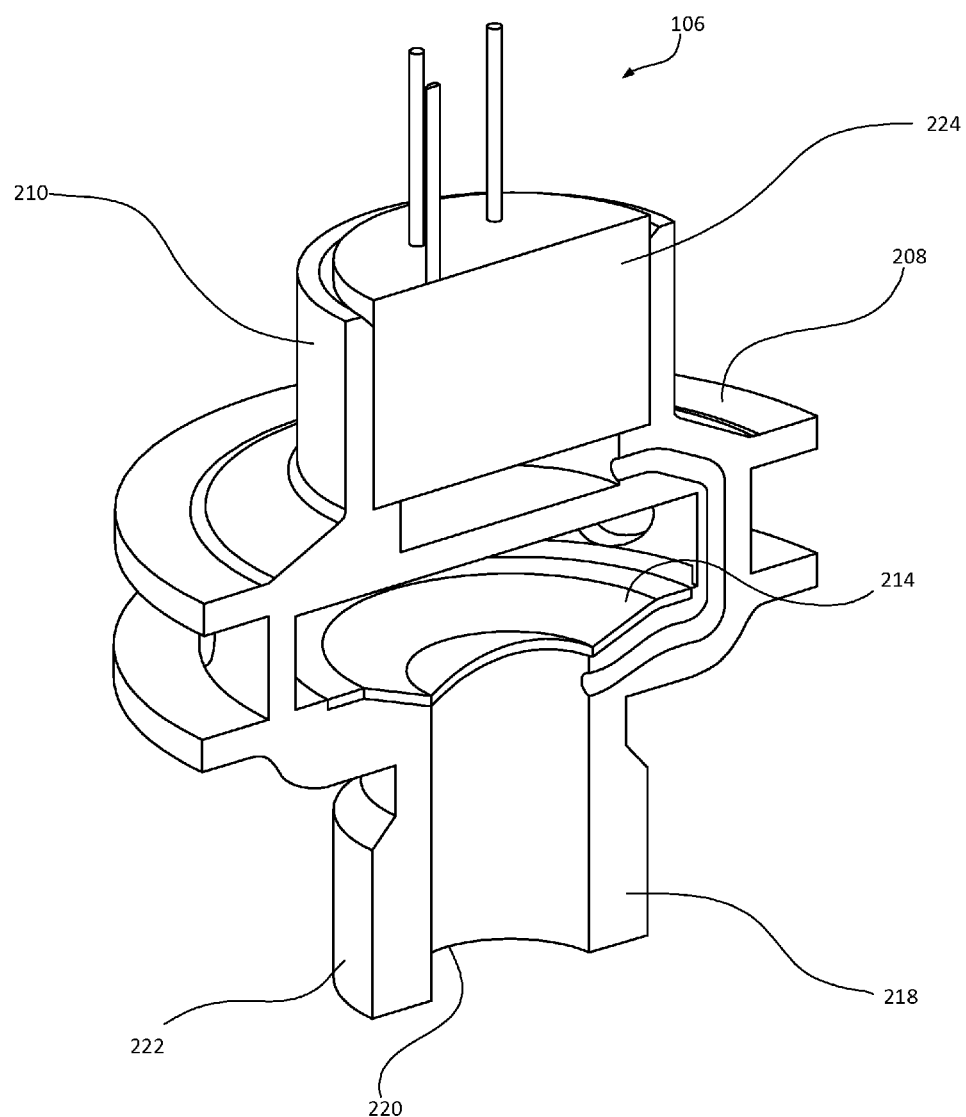
Figure 2C:
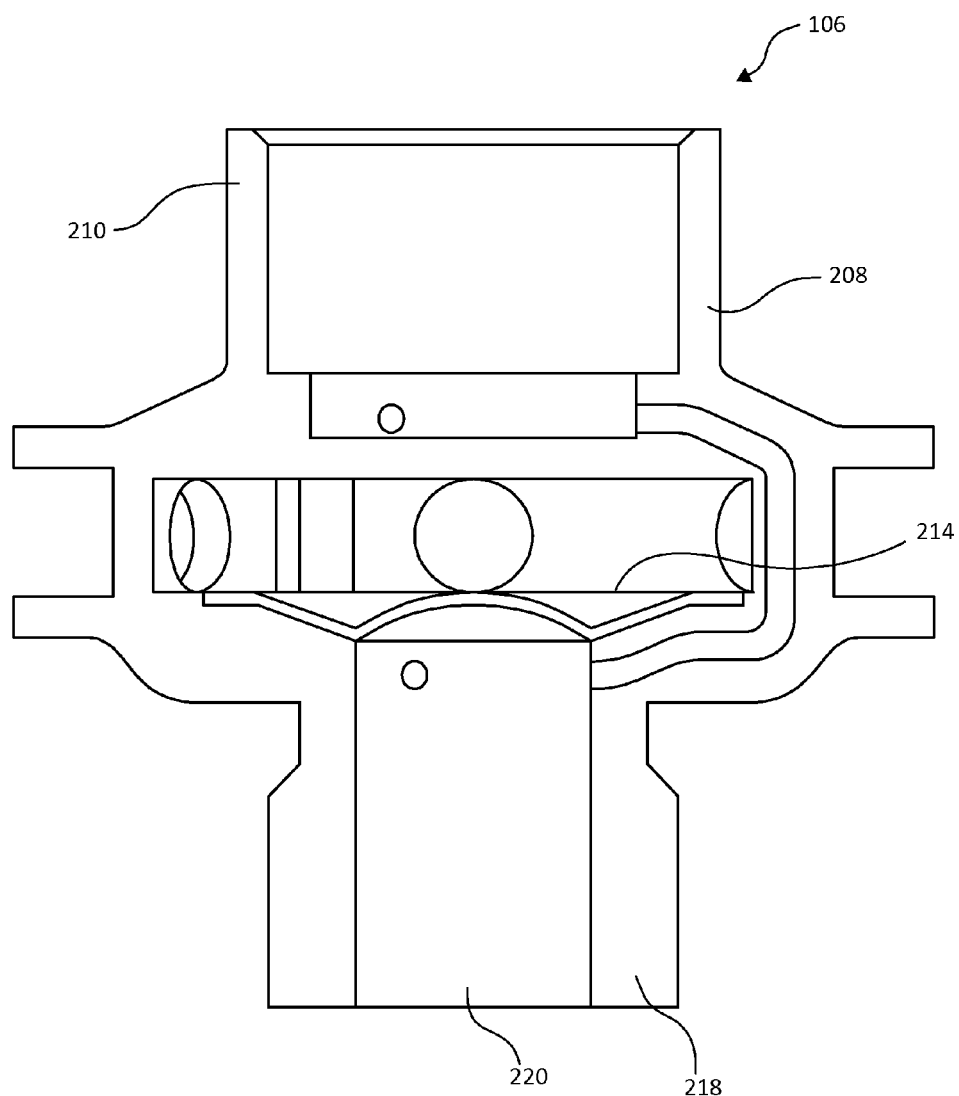

With initial reference to FIGS. 2A-2C, combination sensor 106 may comprise a housing 208 in accordance with various embodiments. In various embodiments, housing 208 comprises a metal, such as brass or steel. In other embodiments, housing 208 comprises a composite material. In yet other embodiments, housing 208 comprises a ceramic material. Although discussed with reference to specific embodiments, housing 208 may comprise any suitable material.

Housing 208 may be manufactured using additive manufacturing techniques, such as, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and/or digital light processing. Housing 208 may also be manufactured using "conventional" techniques such as, for example, casting, machining, welding, or bonding. Any material and configuration of housing 208 capable of withstanding air pressure associated with inflated aircraft tires is within the scope of the present disclosure.

Housing 208 may comprise, for example, a stem 218. Stem 218 may be configured to interact with and be retained by valve receptacle 104. In various embodiments, stem 218 comprises a threaded portion 222. Threaded portion 222 may be complementary to a threaded portion of valve receptacle 104 of wheel 102 (see FIG. 1). Similar to valve receptacle 104, stem 218 may have the same size, shape, and configuration as that of a conventional tire pressure sensor, so as to fit within and be retained by conventional aircraft wheel systems. However, any configuration of stem 218 is within the scope of the present disclosure.

Stem 218 may be open to and in fluid communication with a tire coupled to wheel 102. For example, stem 218 may define an air entry hole 220. In various embodiments, air passes through air entry hole 220 and into housing 208.

In various embodiments, combination sensor 106 is configured to operate as both an over-inflation pressure relief valve and a tire pressure sensor. As such, housing 208 may comprise an over-inflation pressure relief valve segment 212 and a tire pressure sensor segment 210. Over-inflation pressure relief valve segment 212 and tire pressure sensor segment 210 may be in fluid communication with each other, such that the fluid pressure in segment 210 is substantially the same as the fluid pressure in segment 212.

Over-inflation pressure relief valve segment 212 may comprise, for example, a frangible disk 214. Frangible disk 214 may be configured to rupture upon reaching a predetermined pressure, allowing pressure to be released from a tire coupled to wheel 102. In various embodiments, the predetermined pressure at which frangible disk 214 ruptures is selected to be a pressure below that at which damage may occur to components of wheel system 100. For example, frangible disk 214 may be configured to rupture when a tire reaches an inflation pressure of between about 1400 kPa and 2000 kPa, and further, about 1700 kPa. Although described with reference to a particular predetermined pressure, frangible disk 214 may be configured to rupture at any predetermined pressure.

Tire pressure sensor segment 210 of housing 208 may comprise, for example, a pressure sensing element 224. In various embodiments, pressure sensing element 224 is in fluid communication with air entry hole 220 of housing 208, and is configured to sense the pressure of air within a tire coupled to wheel 102.

In various embodiments, tire pressure sensor segment 210 may further comprise a pinless connector (not shown). The pinless connector may comprise, for example, an electronic device coupled to sensing element 224 and capable of communicating with and reporting pressure data to an external device.

With initial reference to FIG. 3, sensor 210 may communicate with a sensor reading device 330 to transmit pressure data. For example, pinless connector 216 of sensor 210 may comprise an electronic device configured to be powered and interrogated by an external magnetic field. In such configurations, sensor reading device 330 may provide an external magnetic field when activated in proximity to pinless connector 216, powering and interrogating pinless connector 216 to obtain pressure data from wheel 102. Sensor reading device 330 may comprise a handheld device such as, for example, a smart electronic wand. Such a sensor reading device 330 may allow an operator to check the pressures of one or more tires without physically coupling each sensor 210 to an interface. However, any sensor reading device capable of communicating with sensor 210 to obtain pressure data is within the scope of the present disclosure.

Sensor reading device 330 may be configured to transmit pressure data from sensor 210 to an interface 340. For example, interface 340 may comprise a display. In various embodiments, interface 340 comprises a display which is integral with sensor reading device, such as a graphical user interface ("GUI") or display screen. In further embodiments, sensor reading device 330 is electronically coupled to an interface 340 such as, for example, a data logging computer. Any interface 340 capable of receiving and/or displaying pressure data from sensor reading device 330 is within the scope of the present disclosure.

Combination sensors of the present disclosure may provide more cost effective and user-friendly tire pressure sensors and over-inflation pressure relief valves. For example, the cost of producing such combination sensors may be less than the cost of producing discrete and separate tire pressure sensors and over-inflation pressure relief valves. Further, such combination sensors may eliminate the need for additional equipment and wiring associated with conventional tire pressure sensor designs.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A combination sensor and pressure release valve, comprising:
    a housing defining at least two air exit openings and comprising a stem defining an air entry opening, wherein the stem is configured to be retained by a valve receptacle of a wheel and wherein the housing is configured to receive air from a tire through the air entry opening, wherein the stem is aligned along a longitudinal axis;
    an over-inflation pressure relief valve segment within the housing, in fluid communication with the air entry opening, and comprising a frangible disk located upstream from the at least two air exit openings and configured to rupture at a predetermined pressure such that the air flows past the frangible disk and through the at least two air exit openings in response to the frangible disk rupturing, the frangible disk comprising a planar surface aligned perpendicular to the longitudinal axis, wherein the at least two air exit openings are orientated perpendicular to the planar surface of the frangible disk; and
    a tire pressure sensor within the housing, aligned along the longitudinal axis, and in fluid communication with the air entry opening, the tire pressure sensor configured to sense a pressure of air received from the tire during inflation of the tire.

2. The combination sensor and pressure release valve of claim 1, wherein the stem comprises a threaded pattern configured to mate with a threaded portion of the valve receptacle.

3. The combination sensor and pressure release valve of claim 1, wherein the predetermined pressure is between 1400 kPa and 2000 kPa.

4. The combination sensor and pressure release valve of claim 3, wherein the predetermined pressure is about 1700 kPa.

5. The combination sensor and pressure release valve of claim 1, wherein the tire pressure sensor is configured to be powered and interrogated by an external magnetic field.

6. The combination sensor and pressure release valve of claim 1, wherein the housing comprises a metal.

7. The combination sensor and pressure release valve of claim 1, wherein the housing is manufactured by an additive process.

8. The combination sensor and pressure release valve of claim 1, wherein the frangible disk is entirely positioned within the housing.

9. The combination sensor and pressure release valve of claim 1, wherein the over-inflation pressure relief valve segment is located between the air entry opening and the tire pressure sensor.

10. An aircraft wheel system, comprising:
    a wheel having a sensor receptacle; and
    a combination pressure sensor and pressure relief valve comprising:
        a housing defining at least two air exit openings and having a stem and an air entry opening, wherein the housing is configured to receive air from a tire through the air entry opening,
        an over-inflation pressure relief valve segment within the housing, in fluid communication with the air entry opening, and comprising a frangible disk located upstream from the at least two air exit openings and configured to rupture at a predetermined pressure such that the air flows past the frangible disk and through the at least two air exit openings in response to the frangible disk rupturing, the frangible disk comprising a planar surface wherein the at least two air exit openings are orientated perpendicular to the planar surface of the frangible disk, the planar surface extending substantially perpendicular to a longitudinal axis; and
        a tire pressure sensor within the housing and in fluid communication with the air entry opening, the tire pressure sensor configured to sense a pressure of air received from the tire during inflation of the tire, wherein the tire pressure sensor, the frangible disk and the over-inflation pressure relief valve segment intersect the longitudinal axis.

11. The aircraft wheel system of claim 10, wherein the stem comprises a threaded pattern configured to mate with a complementary threaded pattern of the sensor receptacle in the wheel.

12. The aircraft wheel system of claim 10, wherein the housing is manufactured by an additive process.

13. The aircraft wheel system of claim 10, wherein the tire pressure sensor is configured to be powered and interrogated by an external magnetic field.

14. The aircraft wheel system of claim 13, further comprising a sensor reading device, wherein the sensor reading device is configured to power and to interrogate the tire pressure sensor and receive a pressure datum from the tire pressure sensor.

15. The aircraft wheel system of claim 14, further comprising an interface, wherein the sensor reading device transmits the pressure datum to the interface.

16. The aircraft wheel system of claim 10, wherein the predetermined pressure is between 1400 kPa and 2000 kPa.

17. The aircraft wheel system of claim 16, wherein the predetermined pressure is about 1700 kPa.

* * * * *